(12) United States Patent
Uno et al.

(10) Patent No.: US 7,919,950 B2
(45) Date of Patent: Apr. 5, 2011

(54) POWER FACTOR CORRECTION CONVERTER

(75) Inventors: Yoshiyuki Uno, Nagaokakyo (JP); Tomokuni Tokugawa, Kyoto (JP); Tatsuya Hosotani, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/652,103

(22) Filed: Jan. 5, 2010

(65) Prior Publication Data

US 2010/0097829 A1 Apr. 22, 2010

Related U.S. Application Data

(63) Continuation of application No. PCT/JP2008/056772, filed on Apr. 4, 2008.

(30) Foreign Application Priority Data

Jul. 9, 2007 (JP) .................................. 2007-179237

(51) Int. Cl.
G05F 1/70 (2006.01)
(52) U.S. Cl. .......................... 323/207; 323/222; 363/127
(58) Field of Classification Search .................. 323/207, 323/222; 363/89, 127
See application file for complete search history.

(56) References Cited

U.S. PATENT DOCUMENTS

| 7,250,742 | B2 * | 7/2007 | Li ................................... 323/207 |
| 2004/0178784 | A1 | 9/2004 | Okamoto | |
| 2007/0103949 | A1 | 5/2007 | Tsuruya | |

FOREIGN PATENT DOCUMENTS

| JP | 63-069465 A | 3/1988 |
| JP | 05-191976 A | 7/1993 |
| JP | 2000-069752 A | 3/2000 |
| JP | 2000-350462 A | 12/2000 |
| JP | 2001-145358 A | 5/2001 |
| JP | 2001-161069 A | 6/2001 |
| JP | 2002-354798 A | 12/2002 |
| JP | 2003-274656 A | 9/2003 |
| JP | 2004-274899 A | 9/2004 |
| JP | 2004-282958 A | 10/2004 |
| JP | 2005-253284 A | 9/2005 |
| JP | 2006-067730 A | 3/2006 |
| JP | 2007-046972 A | 2/2007 |

OTHER PUBLICATIONS

Offical Communication issued in International Patent Application No. PCT/JP2008/056772, mailed on Jul. 15, 2008.

* cited by examiner

*Primary Examiner* — Shawn Riley
(74) *Attorney, Agent, or Firm* — Keating & Bennett, LLP

(57) ABSTRACT

A power factor correction converter includes a diode bridge arranged to perform full-wave rectification on an AC input power supply, a switching element arranged to perform switching on an output voltage thereof, an inductor arranged to pass a current interrupted by the switching element and to accumulate and emit excitation energy, a diode, and a smoothing capacitor defining a step-up chopper circuit. A digital signal processing circuit detects a phase of an input voltage, and a switching frequency of the switching element is modulated in accordance with the phase. Accordingly, the switching frequency can be appropriately modulated without depending on an input voltage, so that a wide range of input voltages can be accepted while suppressing EMI noise with a peak generated in the switching frequency and higher-order frequency components thereof.

10 Claims, 8 Drawing Sheets

$V_{ac}$ $V_i$ $V_0$ $I_i$ $I_{ac}$

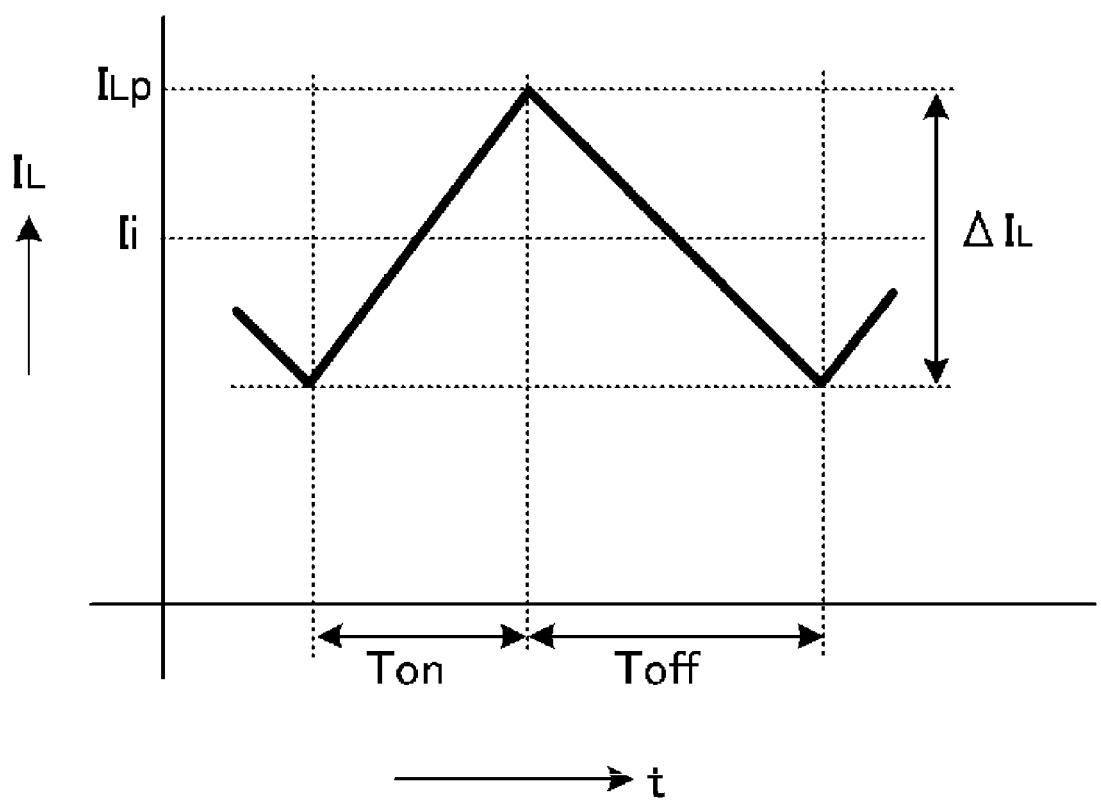

POWER FACTOR CORRECTION CONVERTER

BACKGROUND OF THE INVENTION

1. Field of the Invention

The present invention relates to an alternating current to direct current (AC-DC) converter that receives an AC power supply and that outputs a DC voltage, and particularly to a power factor correction (PFC) converter provided to improve a power factor.

2. Description of the Related Art

In Japan, Europe, and other countries, harmonic current control that is classified in accordance with an application or an input power is performed. In order to respond to such control, a circuit called a PFC converter is added to a power supply of home appliances that are subjected to harmonic current control, whereby measures have been taken to suppress harmonic currents.

In a typical switching power supply device using a commercial AC power supply as an input power supply, the commercial AC power supply is rectified and smoothed so as to be converted to a DC voltage, and switching by a DC-DC converter is performed on the DC voltage. Therefore, an input current is discontinuous and is significantly distorted as compared to a sinusoidal wave. This causes a harmonic current.

To suppress the harmonic current, a PFC converter is provided in a stage after a full-wave rectifier circuit and before a smoothing circuit configured using a smoothing capacitor.

This PFC converter, which is defined by a chopper circuit, operates so that an envelope of an input current waveform and that of an input voltage waveform have the same phase, i.e., have similar sinusoidal waveforms. Accordingly, a harmonic current can be suppressed to a desired level or less.

However, in a typical PFC converter that performs a chopper operation at a given switching frequency, electromagnetic interference (EMI) noise with a high peak value occurs in the switching frequency and higher-order frequencies thereof. Japanese Unexamined Patent Application Publication No. 2004-282958 discloses a PFC converter which improves these conditions. In the PFC converter, a switching frequency is changed within a range in which an original purpose is not impaired, whereby EMI noise is dispersed on a frequency axis to decrease the peak value of the EMI noise. Also, the switching frequency of the PFC converter in the vicinity of a peak value of an input voltage waveform is increased, whereby the size of an inductor L1 can be reduced.

An example of the PFC converter disclosed in Japanese Unexamined Patent Application Publication No. 2004-282958 will be described with reference to FIG. 1.

In the power factor correction converter illustrated in FIG. 1, a series circuit including a step-up reactor L1, a switching element Q1 defined by a MOSFET, and a current detecting resistor R is connected to both output terminals of a diode bridge B1 that rectifies an AC power supply voltage of an AC power supply Vac1. A series circuit including a diode D1 and a smoothing capacitor C1 is connected to both ends of the switching element Q1, and a load RL is connected to both ends of the smoothing capacitor C1. The switching element Q1 is turned on/off under pulse width modulation (PWM) control by a control circuit 10. The current detecting resistor R detects an input current flowing through the diode bridge B1.

The control circuit 10 includes an error amplifier 111, a multiplier 112, an error amplifier 113, a voltage controlled oscillator (VCO) 115, and a PWM comparator 116.

The error amplifier 111 calculates an error between a voltage of the smoothing capacitor C1 and a reference voltage E1. The multiplier 112 multiplies an error voltage signal by a voltage rectified by the diode bridge B1. The error amplifier 113 generates an error between a multiplication result generated by the multiplier 112 and a current signal flowing through the diode bridge B1 and outputs the error to the PWM comparator 116.

The VCO 115 generates a triangular-wave signal of a frequency according to a voltage value of a rectified AC power supply voltage.

In the PWM comparator 116, a triangular-wave signal from the VCO 115 is input to a negative terminal, whereas a signal from the error amplifier 113 is input to a positive terminal. That is, the PWM comparator 116 applies a duty pulse according to a current flowing through the diode bridge B1 and an output voltage to the switching element Q1. This duty pulse is a pulse-width control signal that continuously compensates for fluctuations of an AC power supply voltage and a DC load voltage in constant cycles. With this configuration, control is performed so that the waveform of an AC power supply current matches the waveform of an AC power supply voltage, whereby the power factor is improved.

However, in the configuration disclosed in Japanese Unexamined Patent Application Publication No. 2004-282958, an instantaneous value of an input voltage is detected and used as a voltage to be applied to the VCO, whereby the switching frequency is modulated in accordance with the instantaneous value of the input voltage. Therefore, the switching frequency of the PFC converter fluctuates in accordance with fluctuations of an effective value of the input voltage.

For this reason, for electronic apparatuses that are used in a plurality of different countries in which different input voltages are used, the switching frequency significantly varies depending on the area in which the electronic apparatuses are used. For example, the effective value is 100 V in Japan, whereas the effective value is 220 V to 240 V in Europe. In order to provide an electronic apparatus that can be used anywhere in the world, the electronic apparatus needs to be adaptable to a wide range of input voltages, e.g., effective values from about 85 V to about 264 V.

If the switching frequency is allowed to be changed simply in accordance with an input voltage, the switching frequency significantly changes within a voltage range necessary for worldwide use (within a range from about 85 V to about 264 V). When the switching frequency significantly changes in this manner, it is necessary to use an inductor having an inductance that prevents saturation of the inductor even when the switching frequency is low. This causes an increase in the size of the inductor. On the other hand, when the switching frequency is high, a large switching loss occurs.

In order to suppress such an increase in the switching frequency, Japanese Unexamined Patent Application Publication No. 2004-282958 discloses a method for limiting the upper limit of the switching frequency. However, in this case, the following problem arises. That is, as illustrated in FIG. 2, when a circuit is designed by optimizing the switching frequency when the effective value of the input voltage is about 100 V, the circuit operates at the upper limit of the switching frequency in most of the region of an input voltage waveform in an area in which the effective value of the input voltage is about 240 V. Such a situation significantly deteriorates the ability to appropriately change the switching frequency and disperse EMI noise that occurs with a peak.

SUMMARY OF THE INVENTION

To overcome the problems described above, preferred embodiments of the present invention enable appropriate modulation of a switching frequency without depending on an input voltage and provide a PFC converter that is adaptable to a wide range of input voltages while suppressing a peak of EMI noise in the switching frequency and higher-order frequencies thereof.

According to a preferred embodiment of the present invention, a PFC converter includes at least two switching circuits arranged to perform switching on an AC voltage input from an AC input power supply, an inductor arranged to pass a current interrupted by the at least two switching circuits, a smoothing circuit arranged to smooth an output voltage in a stage after the inductor, a phase detecting circuit arranged to detect a phase of a voltage of the AC input power supply, and a switching frequency modulating circuit arranged to modulate a switching frequency of the switching circuits in accordance with a phase of a voltage waveform of the AC input power supply, a half cycle of the voltage waveform of the AC input power supply being one cycle.

According to another preferred embodiment of the present invention, a PFC converter includes a rectifier circuit arranged to perform full-wave rectification on an AC input power supply, a switching circuit arranged to perform switching on an output voltage of the rectifier circuit, an inductor arranged to pass a current interrupted by the switching circuit and to accumulate and emit excitation energy, a smoothing circuit arranged to smooth the output voltage in a stage after the inductor, a phase detecting circuit arranged to detect a phase of a voltage of the AC input power supply, and a switching frequency modulating circuit arranged to modulate a switching frequency of the switching circuit in accordance with a phase of a voltage waveform of the AC input power supply, a half cycle of the voltage waveform of the AC input power supply being one cycle.

Based on the phase of the voltage (waveform) of the AC input power supply, the switching frequency modulating circuit decreases the switching frequency of the switching circuit when an instantaneous value of the voltage of the AC input power supply is at a lower limit or in the vicinity of the lower limit, and increases the switching frequency of the switching circuit when the instantaneous value of the voltage of the AC input power supply is at an upper limit or in the vicinity of the upper limit.

The switching frequency modulating circuit is arranged to obtain a peak value or an effective value of an input voltage based on an instantaneous value obtained through sampling of the voltage of the AC input power supply and shifts a modulation range of the switching frequency of the switching circuit to a low frequency side as the peak value or the effective value is higher.

The phase detecting circuit preferably includes a waveform shaping circuit arranged to shape a waveform of a voltage signal of the AC input power supply, preferably by using a comparator, a Zener diode, a shunt regulator, a photo coupler, or other suitable circuit element, for example, to generate a substantially-rectangular-wave signal, and a circuit arranged to sample the rectangular-wave signal and detect a rise or fall time of the rectangular-wave signal.

The phase detecting circuit preferably samples a voltage signal of the AC input power supply and detects at least one of a time when an instantaneous value of the voltage signal reaches a peak, a time when the instantaneous value is a minimum, and a time when the instantaneous value is a predetermined value.

According to various preferred embodiments of the present invention, the following advantages are obtained.

A switching frequency of a switching circuit is modulated in accordance with a phase of a voltage waveform of an AC input power supply in which a half cycle of the voltage waveform of the AC input power supply is used as a cycle. Accordingly, a PFC converter that is capable of performing switching at an optimal switching frequency regardless of an effective value of the voltage of the AC input power supply and that is adaptable to a wide range of input voltages can be constituted.

The switching frequency of the switching circuit is decreased when an instantaneous value of the AC input power supply voltage is at a lower limit or in the vicinity of the lower limit, whereas the switching frequency of the switching circuit is increased when the instantaneous value of the AC input power supply voltage is at an upper limit or in the vicinity of the upper limit. This enables use within a range in which an inductor is not saturated at a time when an input current becomes large without causing an increase in the inductance of the inductor, and the size and weight can be reduced. Also, since the switching frequency of the switching circuit is decreased when an instantaneous value of the voltage of the AC input power supply is at a lower limit or in the vicinity of the lower limit, a switching loss can be reduced.

A modulation range of the switching frequency of the switching circuit shifts to a low frequency side as a peak value or an effective value of the AC input power supply voltage is higher. Thus, a switching loss can be reduced by decreasing the switching frequency in a range where the inductor is not saturated, and the efficiency can be improved.

A substantially-rectangular-wave signal generated through waveform shaping of a voltage signal of the AC input power supply is sampled, and the phase of the AC input power supply voltage is detected based on a rise or fall time of the signal. Accordingly, only input information of binary signals is necessary to be handled. This reduces an operation process load, whereby the number of bits of an A/D converter can be advantageously reduced, and the cost and power consumption can be reduced.

A voltage signal of the AC input power supply is sampled, and the phase of the AC input power supply voltage is detected from at least one of a time when an instantaneous value of the voltage signal reaches a peak, a time when the instantaneous value is a minimum, and a time when the instantaneous value is a predetermined value. Accordingly, a simple voltage dividing resistor circuit may preferably be used as a circuit provided outside a DSP, for example. As a result, the circuit configuration can be simplified, the size can be reduced, and the reliability can be improved.

Other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a diagram illustrating a method for detecting an input voltage in a PFC converter according to a third preferred embodiment of the present invention.

DETAILED DESCRIPTION OF PREFERRED EMBODIMENTS

First Preferred Embodiment

A PFC converter according to a first preferred embodiment of the present invention will be described with reference to FIGS. 3 to 8B.

Figure 1:
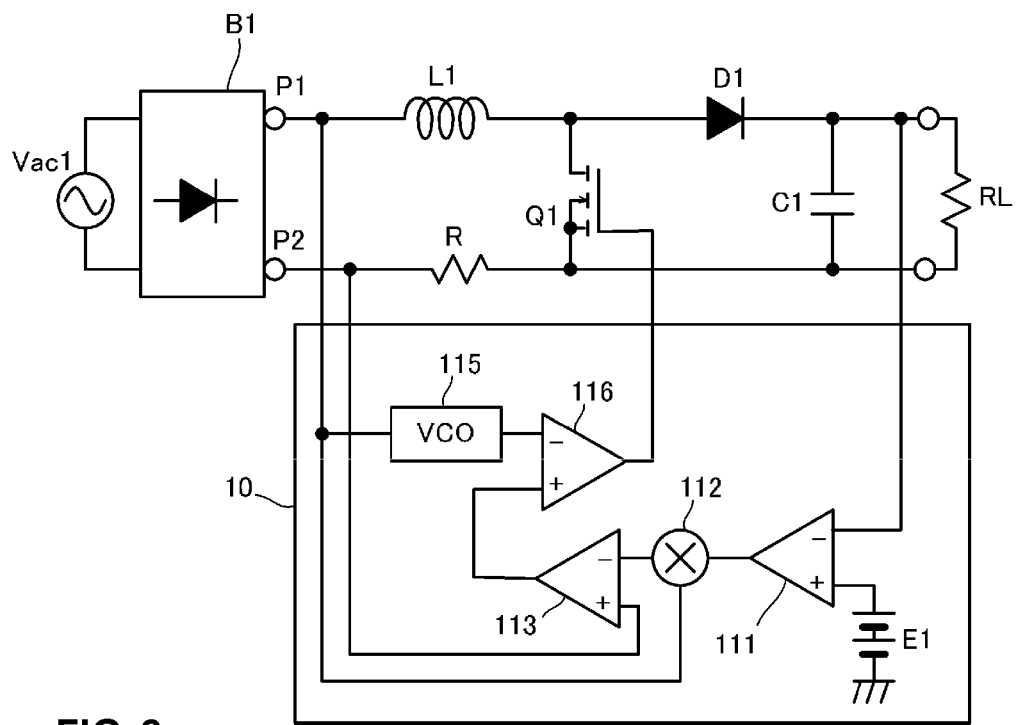
FIG. 1 is a circuit diagram of a PFC converter disclosed in Japanese Unexamined Patent Application Publication No. 2004-282958.
Figure 2:
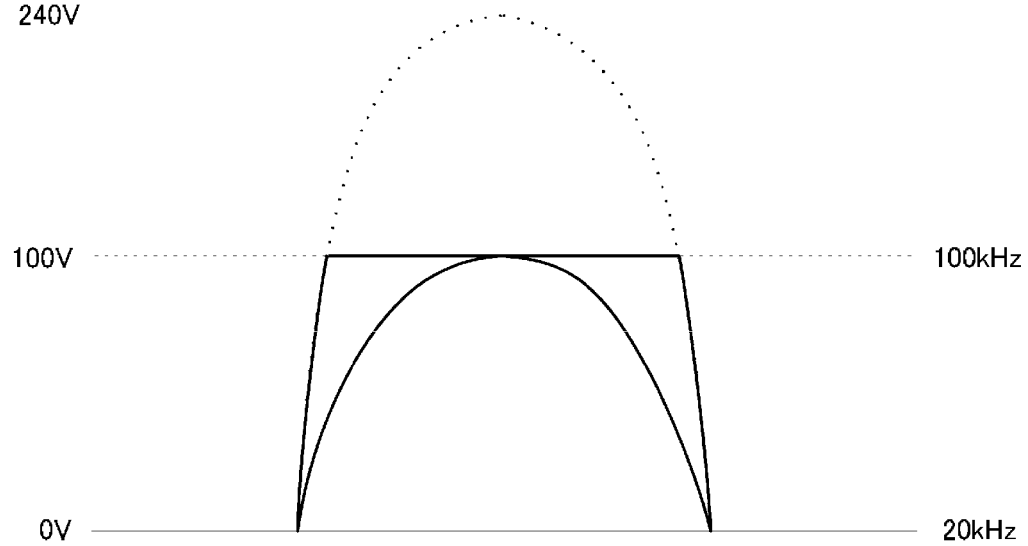
FIG. 2 is a diagram illustrating an example of change of a switching frequency with respect to an input voltage of a conventional PFC converter.
Figure 3:
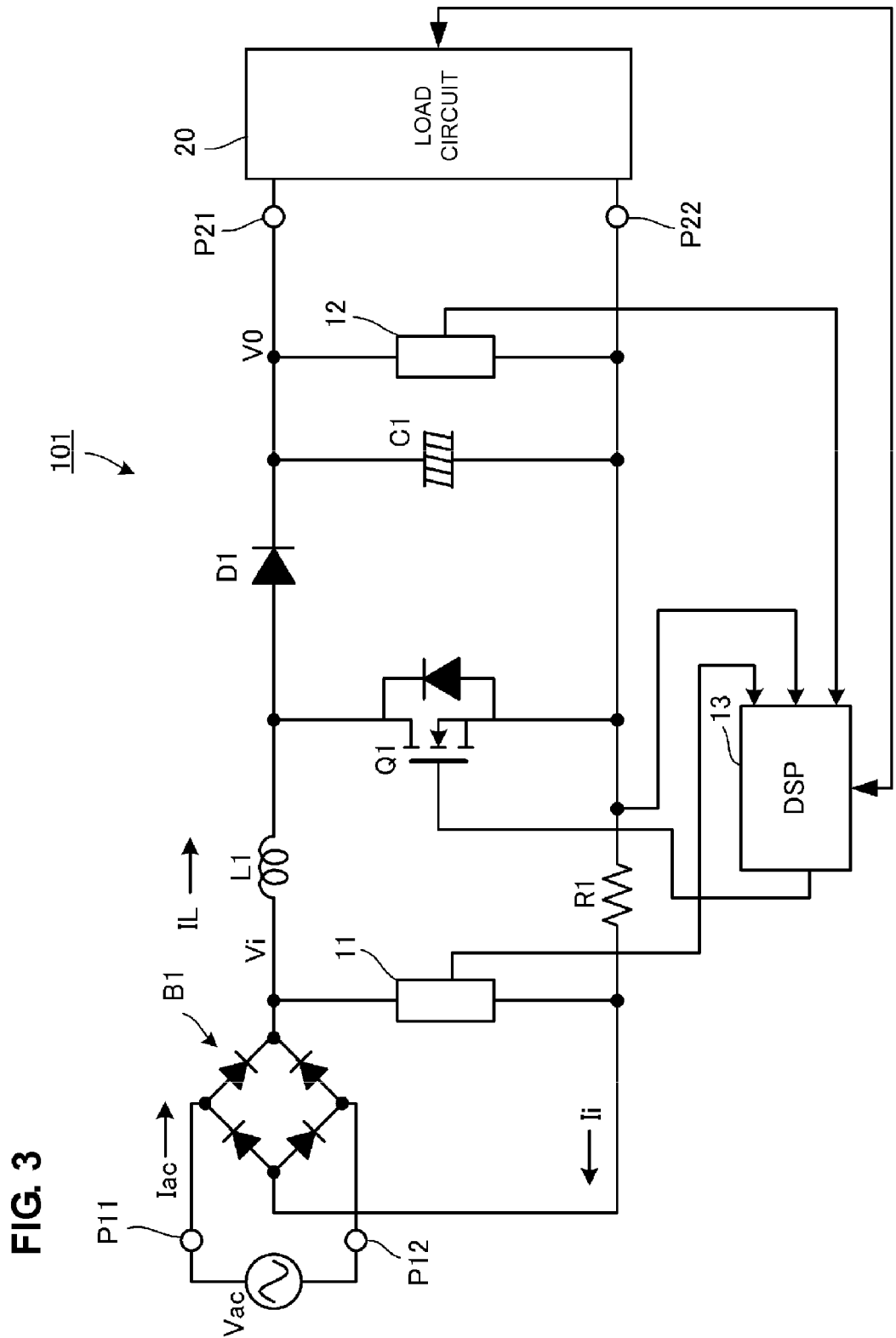
FIG. 3 is a circuit diagram of a PFC converter according to a first preferred embodiment of the present invention.

FIG. 3 is a circuit diagram of the PFC converter according to the first preferred embodiment of the present invention. In FIG. 3, reference numerals P11 and P12 denote input ports of the PFC converter 101, and reference numerals P21 and P22 denote output ports of the PFC converter 101. An AC input power supply Vac, which is a commercial AC power supply, is input to the input ports P11 and P12, and a load circuit 20 is connected to the output ports P21 and P22.

The load circuit 20 is, for example, a circuit of a DC-DC converter and an electronic apparatus that is supplied with power by the DC-DC converter.

In an input stage of the PFC converter 101, a diode bridge B1 that performs full-wave rectification on the AC input power supply Vac is provided. On the output side of the diode bridge B1, a series circuit including an inductor L1, a switching element Q1, and a current detecting resistor R1 is connected. A rectifying and smoothing circuit including a diode D1 and a smoothing capacitor C1 is connected to both ends of the switching element Q1. The inductor L1, the switching element Q1, the diode D1, and the smoothing capacitor C1 define a so-called step-up chopper circuit.

An input voltage detecting circuit 11 is provided between both ends on the output side of the diode bridge B1. Also, an output voltage detecting circuit 12 is provided between the output ports P21 and P22. A digital signal processing circuit 13 is defined by a digital signal processor (DSP) and controls the PFC converter 101 through digital signal processing. That is, the digital signal processing circuit 13 receives an output signal of the input voltage detecting circuit 11 and detects the phase of the voltage of the AC input power supply in the method described below. Also, the digital signal processing circuit 13 receives an output signal of the output voltage detecting circuit 12 and detects an output voltage. Furthermore, the digital signal processing circuit 13 turns on/off the switching element Q1 at a predetermined switching frequency.

Furthermore, the digital signal processing circuit 13 includes a port arranged to communicate with the load circuit 20, thereby performing data communication or input/output of signals, constantly transmitting a status or other information about the converter to the load circuit (electronic apparatus), transmitting an input voltage, an output voltage, and an output current, and receiving a load status or other information from the load circuit side to reflect it in switching control.

FIGS. 4A to 4E include waveform diagrams of a voltage and current in individual portions of the PFC converter illustrated in FIG. 3 in a commercial cycle of the AC input power supply.

Figure 4A:
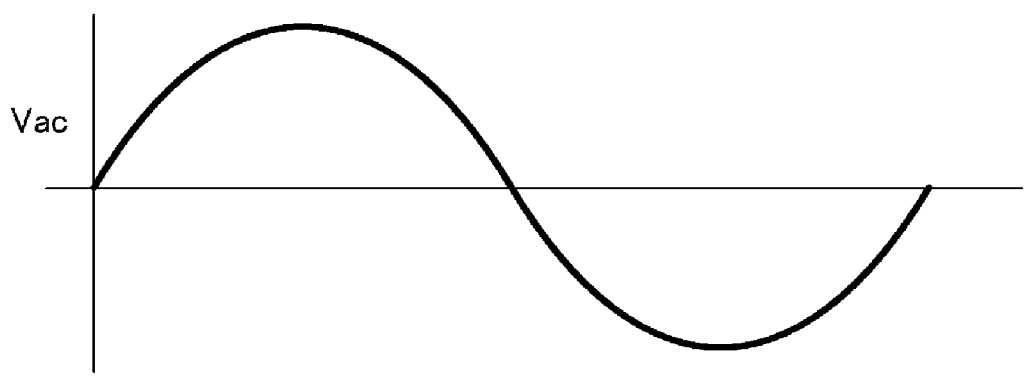
FIGS. 4A to 4E include waveform diagrams of a voltage and current of individual portions of the PFC converter.
Figure 4B:
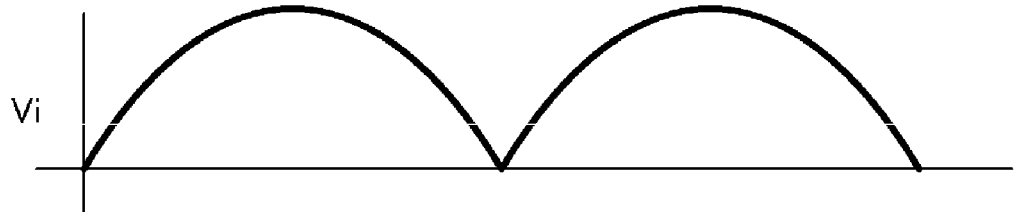
Figure 4C:
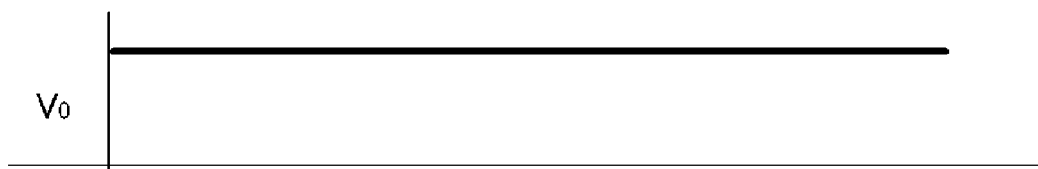
Figure 4D:
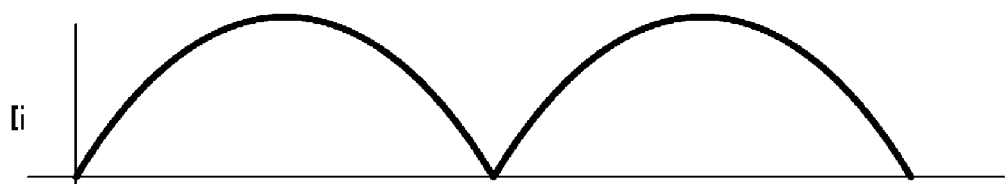
Figure 4E:
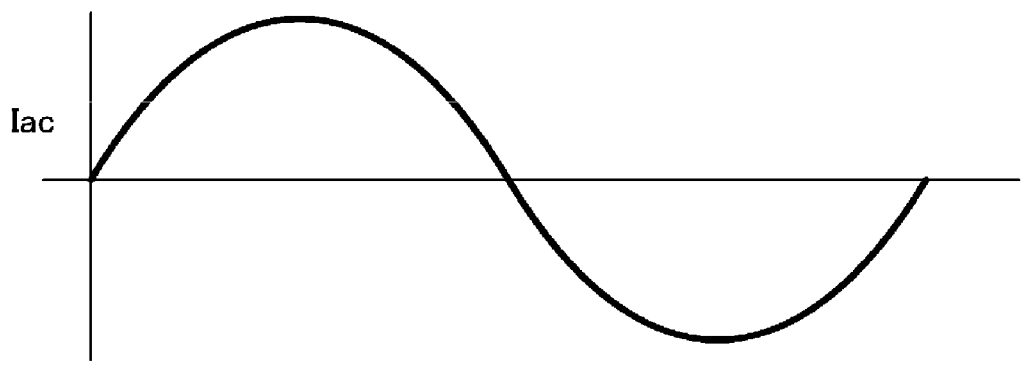

As illustrated in FIG. 4A, the AC input power supply Vac is a sinusoidal AC voltage having a predetermined frequency and a predetermined effective value. Full-wave rectification performed by the diode bridge B1 causes the input voltage applied to the foregoing step-up chopper circuit to have a full-wave rectification waveform, as illustrated in FIG. 4B. Also, as illustrated in FIG. 4C, an output voltage V0 of the PFC converter 101 is a DC voltage depending on a predetermined step-up ratio and an effective value of the AC input power supply voltage. A current Ii flowing on the output side of the diode bridge B1 has a similar waveform as the full-wave rectification waveform illustrated in FIG. 4B. A current Iac flowing through the AC input power supply has a waveform similar to the voltage waveform (FIG. 4A). Accordingly, a harmonic current is suppressed.

Figure 5A:
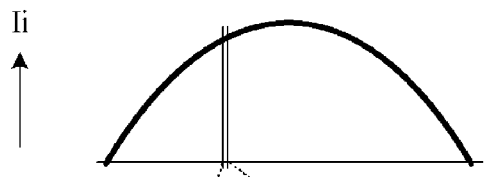
FIGS. 5A to 5C include diagrams illustrating waveforms of a current flowing through an inductor in the PFC converter and an example of on and off times of a switching element.
Figure 5B:
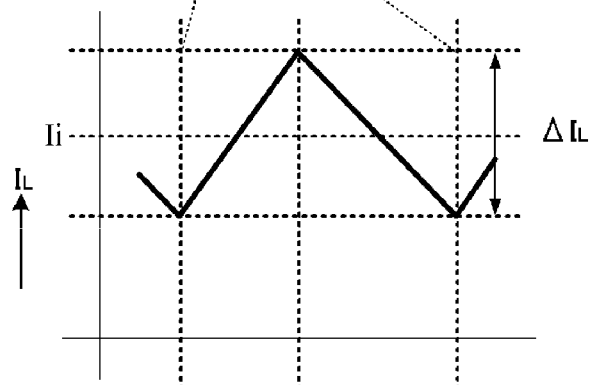
Figure 5C:
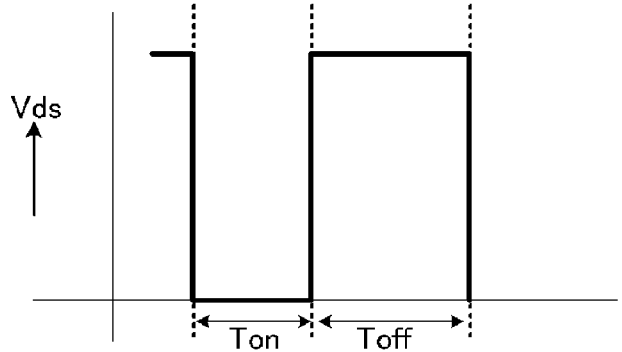

FIGS. 5A to 5C include waveform diagrams of a voltage and current of the PFC converter 101 in a switching cycle.

FIG. 5A is a current waveform of an average value Ii of a current flowing through the inductor L1 in a commercial cycle, FIG. 5B is a waveform diagram of a current $I_L$ flowing through the inductor L1 in a switching cycle, a portion of which is enlarged on a time axis, and FIG. 5C is a waveform diagram of a drain-source voltage Vds of the switching element Q1.

In an on period Ton of the switching element Q1, the current $I_L$ flows through the inductor L1, and the current $I_L$ increases with a slope determined in accordance with a voltage between both ends of the inductor L1 and the inductance of the inductor L1. After that, in an off period Toff of the switching element Q1, the current $I_L$ decreases with a slope determined in accordance with a voltage between the both ends of the inductor L1 and the inductance thereof. In this manner, the current $I_L$ flowing through the inductor L1 fluctuates in the switching cycle within the width of a current ripple $\Delta I_L$.

The digital signal processing circuit 13 performs switching control so that an average value of the current flowing through the inductor follows a full-wave rectification waveform (sinusoidal wave). Accordingly, an input current that is proportional to an input voltage flows, so that a harmonic is suppressed.

Figure 6:
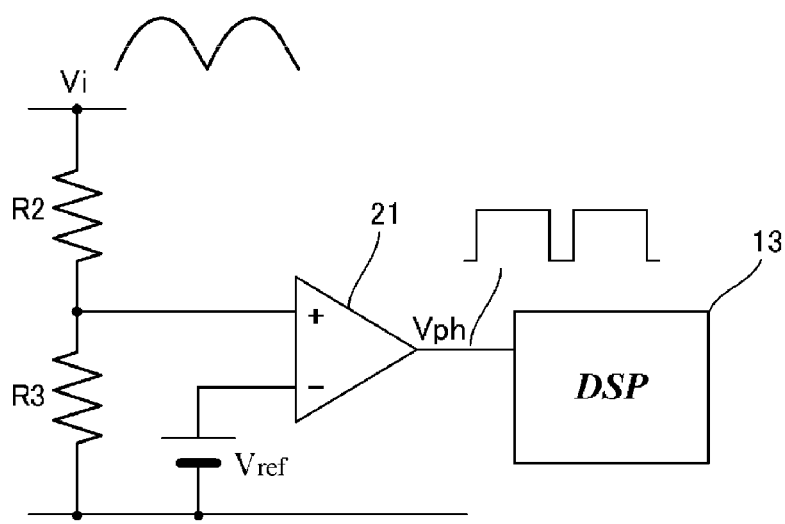
FIG. 6 is a diagram illustrating a configuration example of an input voltage detecting circuit.

FIG. 6 is a circuit diagram illustrating a specific configuration example of the input voltage detecting circuit 11 illustrated in FIG. 3. In FIG. 6, a voltage-dividing resistor circuit including resistors R2 and R3 is arranged to divide an input voltage V1 and input the voltage to a positive terminal of a comparator 21, and input a reference voltage Vref to a negative terminal of the comparator 21. Thus, an output voltage Vph of the comparator 21 functions as a rectangular-wave signal that is at a high level when the full-wave rectification input voltage V1 exceeds a predetermined threshold and is at a low level when the full-wave rectification input voltage V1 does not exceed the predetermined threshold. The digital signal processing circuit 13 detects a phase angle of about 0° of the full-wave rectification input voltage V1 based on a rise time from a low level to a high level of an output signal of the comparator 21 and/or a fall time from a high level to a low level.

The rise time and the fall time of the rectangular-wave signal, which is the output signal Vph of the comparator 21, change when the effective value (or the peak value) of the full-wave rectification input voltage V1 fluctuates. However, a phase angle of about 0° or about 180° of the AC input power supply Vac is to be detected, and thus, the phase angle can be detected without depending on the voltage of the AC input power supply.

Figure 7A:
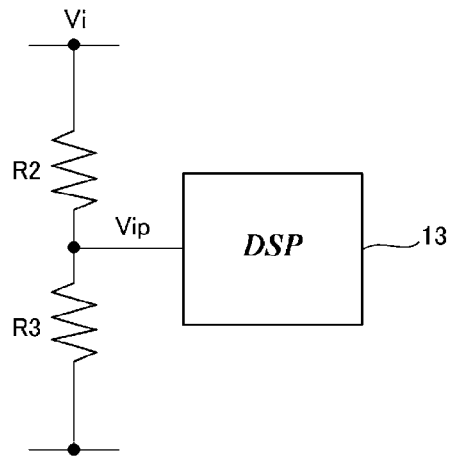
FIGS. 7A and 7B include diagrams illustrating another configuration example of the input voltage detecting circuit.
Figure 7B:
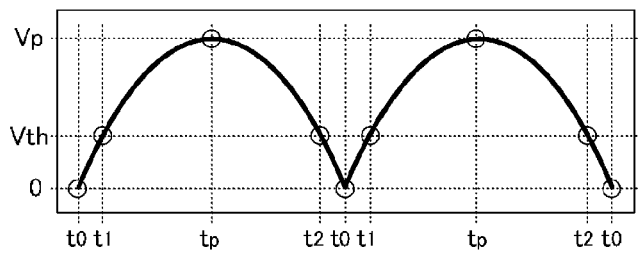

FIGS. 7A and 7B illustrate a configuration example of the input voltage detecting circuit 11 different from the configuration illustrated in FIG. 6. In this example, the voltage-dividing resistor circuit including the resistors R2 and R3 is simply provided, and a divided voltage therefrom is applied to the digital signal processing circuit 13. The digital signal processing circuit 13 receives a voltage signal of the full-wave rectification input voltage Vi, samples the voltage signal in a predetermined sampling cycle and converts the voltage signal into digital data, and sequentially stores the digital data. Then, the digital signal processing circuit 13 detects the phase angle of the full-wave rectification input voltage V1 based on the digital data sequence. The method therefor includes the following three methods.

In the first method, as illustrated in FIGS. 7A and 7B, a time tp when a sampling value reaches a peak during change is detected. At that time, a maximum value in the data sequence may be detected. When the sampling cycle is rough as compared to a commercial cycle, the time when the peak is obtained may be calculated through approximate calculation of a sinusoidal wave based on a series of pieces of data. The time tp is detected as a phase angle of about 90° (or about 270°).

In the second method, times t1 and t2 when a voltage signal of the full-wave rectification input voltage reaches a predetermined threshold Vth are detected, and an intermediate time between t1 and t2 is detected as a phase angle of about 0° (or about)180°.

In the third method, a time t0 when a minimum value is obtained in the sampling data sequence is detected, and the time is detected as a phase angle of about 0° (or about)180° of the full-wave rectification input voltage.

By detecting the phase angle of the full-wave rectification input voltage in the above-described manner, a time change of the phase angle or the time of a half cycle is determined, so that the frequency of the full-wave rectification input voltage can be detected.

According to the above-described circuit configuration, the circuit configuration of the input voltage detecting circuit is extremely simple, and the number of components is significantly reduced.

Based on the phase of the voltage signal of the full-wave rectification input voltage detected in the above-described manner, a sinusoidal wave (an absolute value of the sinusoidal wave) that synchronizes with the input voltage is shaped inside the digital signal processing circuit 13. Based on the sinusoidal wave, the switching frequency of the switching element Q1 is modulated.

Figure 8A:
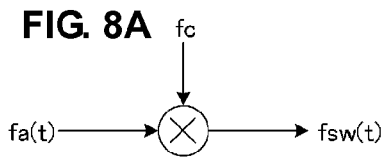
FIGS. 8A and 8B include diagrams illustrating modulation control of a switching frequency in accordance with an instantaneous value of an input voltage.
Figure 8B:
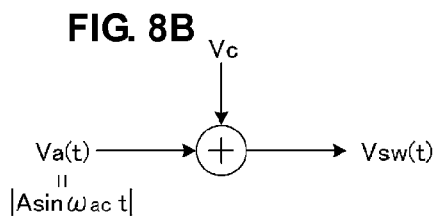

FIGS. 8A and 8B include diagrams illustrating the control thereof. In FIG. 8A, fc represents a fixed switching frequency when frequency modulation is not performed, and fa(t) represents a modulation frequency that fluctuates with a time lapse. Switching of the switching element Q1 is performed using a frequency fsw(t), which is obtained as a result of modulating the fixed frequency fc with the modulation frequency fa(t).

FIG. 8B illustrates a process in the digital signal processing circuit 13. Here, a value Vc is a value corresponding to the foregoing fixed frequency fc, and Va(t) is a value corresponding to the foregoing modulation frequency fa(t). That is, when an angular frequency of an input voltage is represented by ωac, Va(t)=|A sin ωact| is obtained. Since ωac is known as described above, Va(t) is calculated based on the value of sin ωact. Vsw is a value corresponding to the forgoing switching frequency fsw(t) and is obtained by calculating Vsw(t)=Vc+Va(t). The switching element Q1 is turned on/off in a switching cycle to achieve the switching frequency according to the value of Vsw(t). As a result, the switching frequency fluctuates within a predetermined frequency range, so that EMI noise with a peak that occurs in the switching frequency and higher-order frequency components thereof can be suppressed.

Second Preferred Embodiment

In the first preferred embodiment, a sinusoidal wave that is synchronized with an input voltage is preferably generated in the digital signal processing circuit 13. In the second preferred embodiment of the present invention, an input voltage signal preferably is detected and is normalized, and the normalized signal is used as a signal for frequency modulation. The circuit configuration of a PFC converter is substantially the same as that illustrated in FIG. 3.

Figure 9:
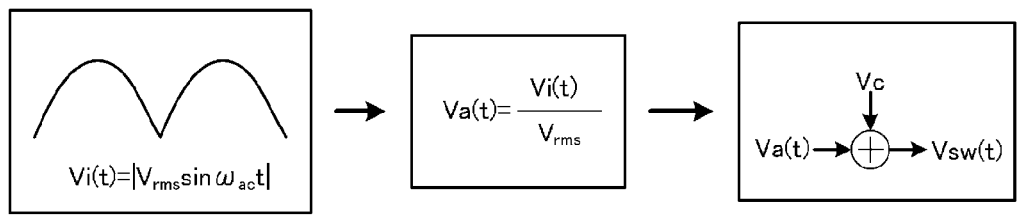
FIG. 9 is a diagram illustrating modulation control of a switching frequency in a PFC converter according to a second preferred embodiment of the present invention.

FIG. 9 is a diagram illustrating a process of a digital signal control circuit of the PFC converter according to the second preferred embodiment. In FIG. 9, an input voltage V1 is expressed by the following equation.

$Vi(t)=|Vrms \sin(\omega act)|$

Here, Vrms represents an effective value of the input voltage V1, and ωac represents an angular frequency of Vi(t).

This voltage signal is normalized using the effective value thereof, and the normalized signal is expressed by Va(t) in the following equation.

$Va(t)=Vi(t)/Vrms$

Then, the foregoing Va(t) is added to the value Vc corresponding to the fixed frequency, whereby a value Vsw(t) corresponding to the switching frequency is obtained.

The digital signal processing circuit 13 performs switching on the switching element Q1 in a switching cycle to achieve the switching frequency according to the foregoing value Vsw(t).

In this manner, by normalizing the input voltage using the effective value thereof, constant modulation of the switching frequency can be performed even if the effective value of the input voltage changes.

Third Preferred Embodiment

In the first and second preferred embodiments, a voltage signal of a full-wave rectification input voltage preferably is directly input to the digital signal processing circuit in order to detect a voltage waveform of the AC input power supply. In the third preferred embodiment of the present invention, an input voltage is detected based on a current flowing through the inductor L1. The circuit configuration of a PFC converter preferably is substantially the same as that illustrated in FIG. 3.

FIG. 10 is a diagram illustrating an on time Ton and an off time Toff of the switching element Q1 and a waveform of a current flowing through the inductor L1.

The current $I_L$ flowing through the inductor L1 is detected by the digital signal processing circuit 13 based on a voltage drop of the current detecting resistor R1. The digital signal processing circuit 13 then calculates an instantaneous value of the full-wave rectification input voltage V1 in accordance with the following equations.

$$\Delta I_L = (Vi/L) Ton \quad (1)$$

$$Vi = L\Delta I_L / Ton \quad (2)$$

In this manner, by detecting the full-wave rectification input voltage Vi based on the current flowing through the inductor L1, the necessity of the input voltage detecting circuit 11 is eliminated, such that the entire circuit can be further simplified.

In FIG. 10, the current in the period Ton is the current flowing through the switching element Q1. Thus, the input voltage V1 can also be detected by providing the current detecting resistor R1 illustrated in FIG. 3 in a path of the current flowing through the switching element Q1 and detecting the current of the Q1 as a voltage signal.

Additionally, the current flowing through the inductor may be detected by providing a current detecting resistor in a line of the diode bridge B1 connected to the inductor, instead of by using a method for detecting the current based on a voltage drop of the current detecting resistor R1 illustrated in FIG. 3. Alternatively, the current may be detected by using a current transformer or a Hall element, for example.

Fourth Preferred Embodiment

In a fourth preferred embodiment of the present invention, another example of switching frequency modulation will be described. The circuit configuration of a PFC converter is substantially the same as that illustrated in FIG. 3.

Figure 11A:
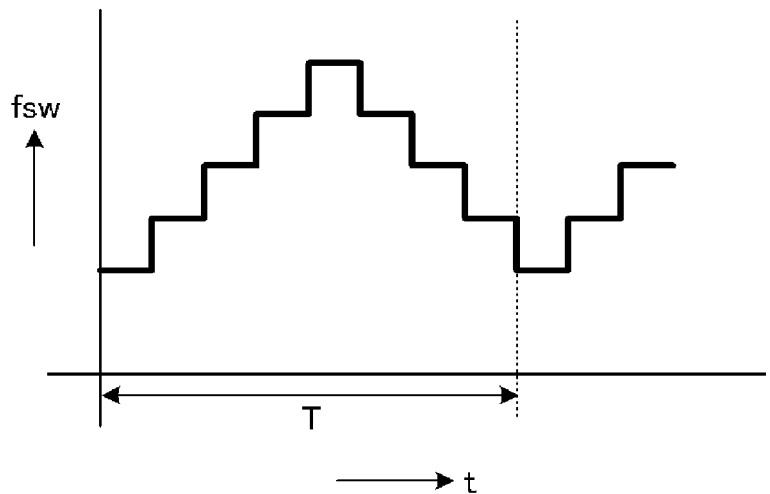
FIGS. 11A to 11C include diagrams illustrating modulation control of a switching frequency in a PFC converter according to a fourth preferred embodiment of the present invention.

In the first to third preferred embodiments, the switching frequency preferably is continuously modulated in accordance with a change in voltage of the AC input power supply. FIG. 11A illustrates discrete modulation of a switching frequency. In FIG. 11A, the horizontal axis indicates the time and the vertical axis indicates the switching frequency. In this example, a half cycle T of the input voltage V1 is regarded as one cycle, and a switching frequency fsw is discretely changed at regular time intervals. In this example, the switching frequency preferably includes five steps of values.

When the switching frequency is discretely changed, the phase of an input voltage causes the switching frequency to be decreased when an instantaneous value of the input voltage is at the lower limit or in the vicinity of the lower limit and causes the switching frequency to be increased when an instantaneous value of the input voltage is at the upper limit or in the vicinity of the upper limit. Such frequency modulation causes the switching frequency to have a plurality of values, so that a peak of EMI noise in the switching frequency and a harmonic frequency thereof is suppressed.

Alternatively, in the discrete frequency modulation, the switching frequency may be switched between two values in accordance with the phase of the input voltage. For example, the switching frequency may be modulated to f1 when the phase of the input voltage is about 45° to about 135° and to f2 in the other cases.

Figure 11B:
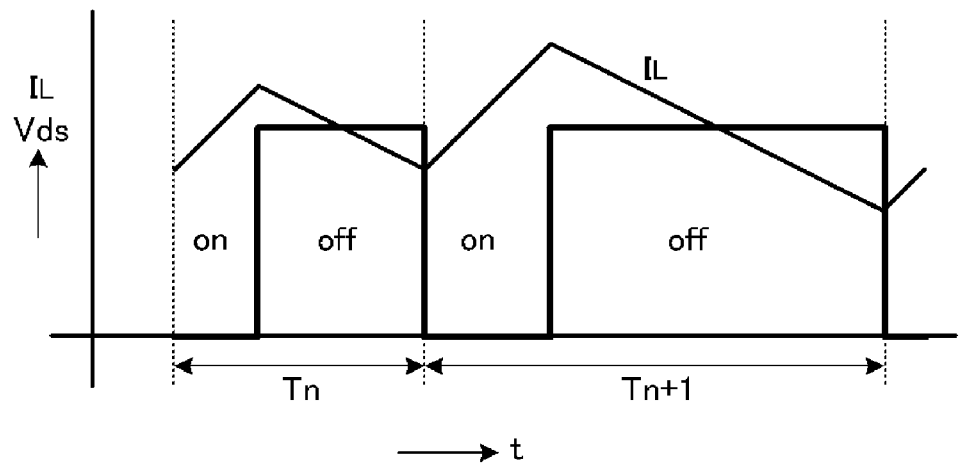

In the example illustrated in FIG. 11B, a switching cycle is calculated and is changed in each switching cycle. In this example, the time of a next switching cycle is calculated at the end of a switching cycle, and the on time and off time of the switching element are controlled in accordance with the time.

Figure 11C:
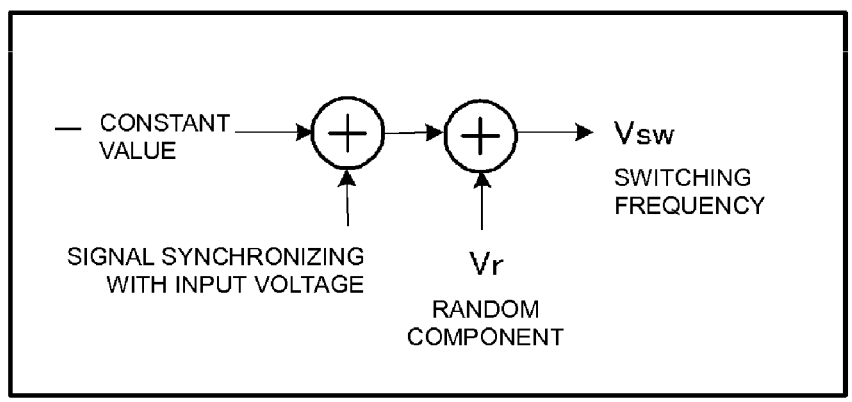

FIG. 11C illustrates an example in which modulation is further performed using a random component other than a value Va of a modulation signal that synchronizes with an input voltage waveform. The random component Vr randomly fluctuates in a range narrower than a change width of the modulation signal Va that synchronizes with the input voltage. The value Vr is obtained through random number calculation.

Also, the frequency modulation may be performed by using a triangular wave that synchronizes with the input voltage or an exponential function.

With this configuration, EMI noise that occurs in the vicinity of the switching frequency further is dispersed on a frequency axis, so that an overall peak can be lowered.

Fifth Preferred Embodiment

A PFC converter according to a fifth preferred embodiment of the present invention performs shift control on a switching frequency in accordance with a peak value or an effective value of an input voltage. The circuit configuration of the PFC converter is substantially the same as that illustrated in FIG. 3.

Figure 12:
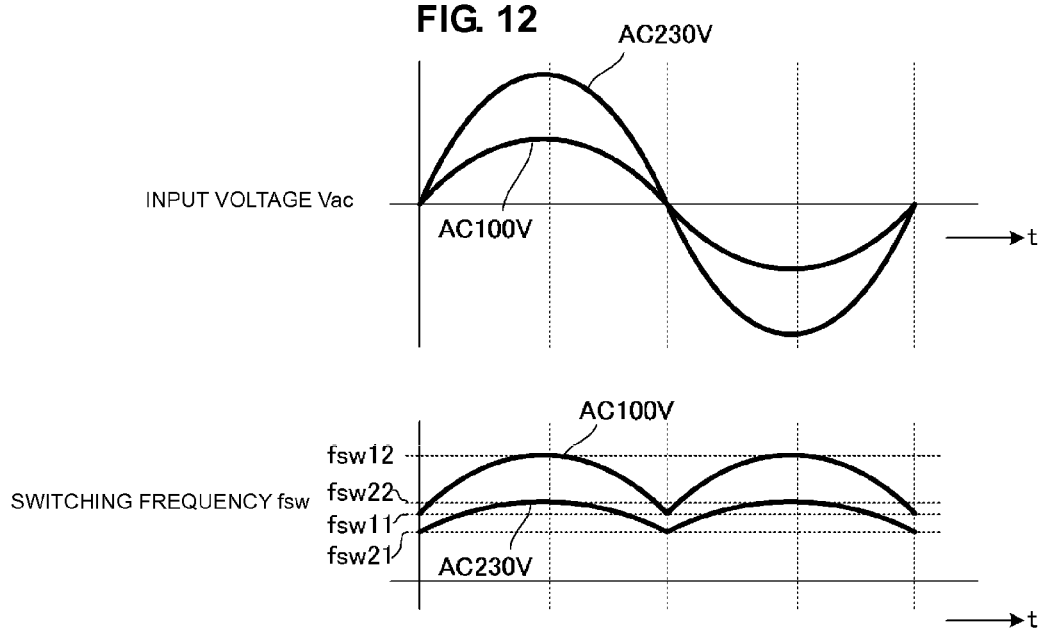
FIG. 12 is a diagram illustrating an example of change of a modulation range of a switching frequency caused by change of a peak value or an effective value of an input voltage of a PFC converter according to a fifth preferred embodiment of the present invention.

FIG. 12 illustrates an example of controlling a switching frequency in accordance with a peak value or an effective value of an input voltage of the PFC converter according to the fifth preferred embodiment. In the first and second preferred embodiments, a description has been provided that the switching frequency fc (Vc when represented by a control value) before modulation is constant. In the fifth preferred embodiment, an instantaneous value of an input voltage is controlled in the same or substantially the same manner as that in the first to fourth preferred embodiments, and an entire modulation range of the switching frequency is shifted in accordance with a peak value or an effective value of the input voltage.

As illustrated in FIG. 12, when the effective value of the AC input power supply is AC about 100 V, for example, the switching frequency changes in a frequency range from fsw11 to fsw12. On the other hand, in a case of AC about 230 V, the switching frequency changes in a range from fsw21 to fsw22.

With such control, a peak value or an effective value of the input voltage may be detected first, and fc (vc as a control value) illustrated in FIGS. 8A to 9 may be changed in accordance with the peak value or the effective value of the input voltage. Accordingly, a switching loss can be reduced by decreasing the switching frequency in the range where the inductor is not saturated, so that the efficiency is improved.

Sixth Preferred Embodiment

Figure 13:
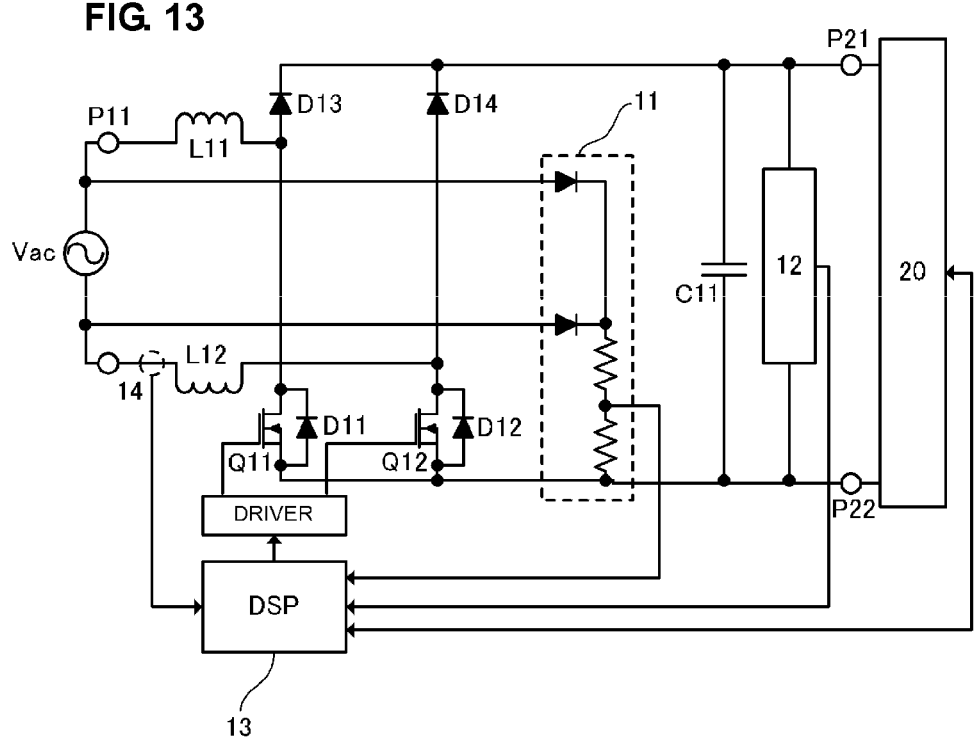
FIG. 13 is a circuit diagram of a PFC converter according to a sixth preferred embodiment of the present invention.

FIG. 13 is a circuit diagram of a PFC converter according to a sixth preferred embodiment of the present invention. In FIG. 13, reference numerals P11 and P12 denote input ports of the PFC converter 102, and reference numerals P21 and P22 denote output ports of the PFC converter 102. An AC input power supply Vac, which is a commercial AC power supply, is input to the input ports P11 and P12, and a load circuit 20 is connected to the output ports P21 and P22.

The load circuit 20 is, for example, a circuit of a DC-DC converter and an electronic apparatus that is supplied with power by the DC-DC converter.

In the example illustrated in FIG. 3, full-wave rectification is performed on the AC input power supply by the diode bridge B1, and then switching of a rectified voltage is performed. In the example illustrated in FIG. 13, switching is performed in a bridge circuit. That is, a switching circuit including switching elements Q11 and Q12 that perform switching on an AC voltage input from the AC input power supply Vac and diodes D11 and D12 (body diodes of FETs may be used as D11 and D12 when the FETs are used as Q11 and Q12) is provided on a lower arm, and diodes D13 and D14 are provided on an upper arm. Also, inductors L11 and L12 that pass a current interrupted by the foregoing switching circuit and a smoothing circuit configured using a capacitor C11 that smoothes an output voltage are provided.

Also, an input voltage detecting circuit 11 is provided as a voltage detecting circuit for the AC input power supply. Furthermore, a Hall element 14 is provided to detect an AC input current.

A digital signal processing circuit 13 is defined by a DSP and controls the PFC converter 102 by performing digital signal processing as described below.

The digital signal processing circuit 13 receives an output signal of the input voltage detecting circuit 11 and detects an AC power supply voltage.

Also, the digital signal processing circuit 13 receives an output signal of the output voltage detecting circuit 12 and detects an output voltage.

Also, the digital signal processing circuit 13 detects an input current from an output signal of the Hall element 14.

Furthermore, the digital signal processing circuit 13 turns on/off the switching elements Q11 and Q12 at a predetermined switching frequency.

A circuit operation caused by switching control of the switching elements Q11 and Q12 performed by the digital signal processing circuit 13 is as follows.

First, the digital signal processing circuit 13 turns on both of the switching elements Q11 and Q12. Accordingly, a current flows through a path Vac→L11→Q11→Q12→L12→Vac, or in the opposite direction, so that excitation energy is accumulated in the inductors L11 and L12.

After that, the digital signal processing circuit 13 turns off both of the switching elements Q11 and Q12. Accordingly, a current flows through a path Vac→L11→D13→C11 (20)→D12→L12→Vac, or a path Vac→L12→D14→C11 (20)→D11→L11→Vac (at this time, Q11 or Q12 connected in parallel to D11 or D12 that is in a continuity state may be in an on state), whereby the excitation energy is emitted from the inductors L11 and L12 and the capacitor C11 is charged with voltage.

In this manner, full-wave rectification and switching are performed on an AC input voltage by the bridge including the switching elements Q11 and Q12 and the diodes D11, D12, D13, and D14. Also, a chopper operation is performed by the inductors L11 and L12 and the foregoing bridge.

The present invention can also be applied to a PFC converter configured to perform switching using such a bridge circuit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A power factor correction converter comprising:
at least two switching circuits arranged to perform switching on an AC voltage input from an AC input power supply;
an inductor arranged to pass a current interrupted by the at least two switching circuits;
a smoothing circuit arranged to smooth an output voltage in a stage after the inductor;
a phase detecting circuit arranged to detect a phase of a voltage of the AC input power supply; and
a switching frequency modulating circuit arranged to modulate a switching frequency of the at least two switching circuits in accordance with a phase of a voltage waveform of the AC input power supply, a half cycle of the voltage waveform of the AC input power supply defining one cycle.

2. A power factor correction converter comprising:
a rectifier circuit arranged to perform full-wave rectification on an AC input power supply;
a switching circuit arranged to perform switching on an output voltage of the rectifier circuit;
an inductor arranged to pass a current interrupted by the switching circuit;
a smoothing circuit arranged to smooth the output voltage in a stage after the inductor;
a phase detecting circuit arranged to detect a phase of a voltage of the AC input power supply; and
a switching frequency modulating circuit arranged to modulate a switching frequency of the switching circuit in accordance with a phase of a voltage waveform of the AC input power supply, a half cycle of the voltage waveform of the AC input power supply defining one cycle.

3. The power factor correction converter according to claim 1, wherein, based on the phase of the voltage of the AC input power supply, the switching frequency modulating circuit decreases the switching frequency of the switching circuit when an instantaneous value of the voltage of the AC input power supply is at a lower limit or in the vicinity of the lower limit, and increases the switching frequency of the switching circuit when the instantaneous value of the voltage of the AC input power supply is at an upper limit or in the vicinity of the upper limit.

4. The power factor correction converter according to claim 1, wherein the switching frequency modulating circuit is arranged to obtain a peak value or an effective value of an input voltage based on an instantaneous value obtained through sampling of the voltage of the AC input power supply and to shift a modulation range of the switching frequency of the switching circuit to a low frequency side as the peak value or the effective value is increased.

5. The power factor correction converter according to claim 1, wherein the phase detecting circuit includes a waveform shaping circuit arranged to shape a waveform of a voltage signal of the AC input power supply to generate a substantially-rectangular-wave signal, and a circuit arranged to detect a rise and/or fall time of the rectangular-wave signal.

6. The power factor correction converter according to claim 1, wherein the phase detecting circuit is arranged to sample a voltage signal of the AC input power supply and detect at least one of a time when an instantaneous value of the voltage signal reaches a peak, a time when the instantaneous value is a minimum, and a time when the instantaneous value is a predetermined value.

7. The power factor correction converter according to claim 2, wherein, based on the phase of the voltage of the AC input power supply, the switching frequency modulating circuit decreases the switching frequency of the switching circuit when an instantaneous value of the voltage of the AC input power supply is at a lower limit or in the vicinity of the lower limit, and increases the switching frequency of the switching circuit when the instantaneous value of the voltage of the AC input power supply is at an upper limit or in the vicinity of the upper limit.

8. The power factor correction converter according to claim 2, wherein the switching frequency modulating circuit is arranged to obtain a peak value or an effective value of an input voltage based on an instantaneous value obtained through sampling of the voltage of the AC input power supply and to shift a modulation range of the switching frequency of the switching circuit to a low frequency side as the peak value or the effective value is increased.

9. The power factor correction converter according to claim 2, wherein the phase detecting circuit includes a waveform shaping circuit arranged to shape a waveform of a voltage signal of the AC input power supply to generate a substantially-rectangular-wave signal, and a circuit arranged to detect a rise and/or fall time of the rectangular-wave signal.

10. The power factor correction converter according to claim 2, herein the phase detecting circuit is arranged to sample a voltage signal of the AC input power supply and detect at least one of a time when an instantaneous value of the voltage signal reaches a peak, a time when the instantaneous value is a minimum, and a time when the instantaneous value is a predetermined value.

* * * * *